United States Patent
Hirano

(10) Patent No.: US 9,841,934 B2
(45) Date of Patent: Dec. 12, 2017

(54) INFORMATION PROCESSING APPARATUS, INSTALLATION SYSTEM, AND INSTALLATION METHOD

(71) Applicant: Yuuki Hirano, Kanagawa (JP)

(72) Inventor: Yuuki Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/181,790

(22) Filed: Jun. 14, 2016

(65) Prior Publication Data

US 2017/0017444 A1    Jan. 19, 2017

(30) Foreign Application Priority Data

Jul. 13, 2015 (JP) ................................. 2015-139815

(51) Int. Cl.
*G06F 3/12* (2006.01)
*H04N 1/00* (2006.01)

(52) U.S. Cl.
CPC .......... *G06F 3/1225* (2013.01); *G06F 3/1204* (2013.01); *G06F 3/1205* (2013.01); *G06F 3/1276* (2013.01); *G06F 3/1285* (2013.01); *G06F 3/1286* (2013.01); *H04N 1/00244* (2013.01); *H04N 1/00411* (2013.01); *H04N 1/00938* (2013.01); *H04N 2201/0094* (2013.01)

(58) Field of Classification Search
CPC .. G06F 3/1225; G06F 3/1276; H04N 1/00938
USPC .................... 358/1.15; 399/66; 709/239, 244
See application file for complete search history.

(56) References Cited

U.S. PATENT DOCUMENTS

| 2002/0067504 A1* | 6/2002 | Salgado | ................ G06F 9/4411 358/1.15 |
|---|---|---|---|
| 2003/0234950 A1* | 12/2003 | Lay | ........................ G06F 3/1204 358/1.14 |
| 2005/0060649 A1 | 3/2005 | Kimura et al. | |
| 2005/0200889 A1 | 9/2005 | Oomura | |

(Continued)

FOREIGN PATENT DOCUMENTS

| JP | 2007-086969 | 4/2007 |
|---|---|---|
| JP | 2014-108563 | 6/2014 |

OTHER PUBLICATIONS

Extended European Search Report dated Nov. 29, 2016 issued in corresponding European Application No. 16174836.3.

*Primary Examiner* — Jamares Q Washington
(74) *Attorney, Agent, or Firm* — Harness, Dickey & Pierce

(57) ABSTRACT

An information processing apparatus includes a detector configured to detect whether a first printer serving as a connection destination of an installed first driver has been changed to a second printer; an information acquirer configured to, when the first printer has been changed, acquire from the first driver first information and acquire from the second printer second information; an inquirer configured to request information on a driver for the second printer together with the first and second information to a server, and receive a response including the information on the driver for the second printer; a decider configured to determine a second driver to be installed from drivers indicated by the response; a driver acquirer configured to acquire the second driver from the server; and an installer configured to carry over print settings of the first driver to install the second driver.

20 Claims, 13 Drawing Sheets

(56) References Cited

U.S. PATENT DOCUMENTS

| | | | |
|---|---|---|---|
| 2006/0044596 A1* | 3/2006 | Ota | H04N 1/00204 358/1.15 |
| 2009/0109481 A1* | 4/2009 | Ozaki | G06F 3/1204 358/1.15 |
| 2010/0182638 A1* | 7/2010 | Kimura | G06F 3/1204 358/1.15 |
| 2011/0286034 A1 | 11/2011 | Hirano | |
| 2013/0107320 A1* | 5/2013 | Vidyanand | G06F 3/1204 358/1.15 |

* cited by examiner

CONNECTION DESTINATION INFORMATION

| DEVICE NAME | DEVICE C |
|---|---|
| CORRESPONDING PDL | PCL, PC-Fax |
| CORRESPONDING TYPE | PRINTER, FAX, SCANNER |

FIG.10

DRIVER LIST OF DEVICE C

| DEVICE NAME | TYPE | PDL | DRIVER NAME | VERSION | COMPATI-BILITY OF PRINT SETTINGS | ARCHITEC-TURE | DRIVER ACQUISITION URL |
|---|---|---|---|---|---|---|---|
| DEVICE C | PRINTER | PCL | DRIVER C_PCL | v1.0.0.0 | ○ | x86 | https://www.abc.com/drv01.exe |
| | | | | | ○ | x64 | https://www.abc.com/drv02.exe |
| | | PS | DRIVER C_PS | v1.0.0.0 | × | x86 | https://www.abc.com/drv05.exe |
| | | | | | × | x64 | https://www.abc.com/drv06.exe |
| | FAX | PC-Fax | DRIVER C_PC-Fax | v1.1.0.0 | × | x86 | https://www.abc.com/drv07.exe |
| | | | | | × | x64 | https://www.abc.com/drv08.exe |
| | SCANNER | - | DRIVER C_SCANNER | v1.0.0.0 | × | x86 | https://www.abc.com/drv09.exe |
| | | | | | × | x64 | https://www.abc.com/drv10.exe |

INFORMATION PROCESSING APPARATUS, INSTALLATION SYSTEM, AND INSTALLATION METHOD

CROSS-REFERENCE TO RELATED APPLICATION

The present application claims priority under 35 U.S.C. §119 to Japanese Patent Application No. 2015-139815, filed Jul. 13, 2015. The contents of which are incorporated herein by reference in their entirety.

BACKGROUND OF THE INVENTION

1. Field of the Invention

The present invention relates to an information processing apparatus, an installation system, and a method of installation.

2. Description of the Related Art

In order to cause a printer to print data on a personal computer (PC), there is a necessity to install a printer driver that performs conversion into a page description language (PDL) corresponding to the printer (such as Printer Control Language (PCL), PostScript, or Portable Document Format (PDF)). With a printer icon (a logical printer) indicating a printer controlled by the printer driver, print setting information at the time of printing of the printer can be associated, and the print settings can be used at the time of printing by the printer. In Windows (registered trademark), from a property screen displayed by an operation on the printer icon, the print settings of the printer driver associated with the printer icon can be edited, for example.

When printing is executed using a printer driver with a PDL that does not correspond to the printer, the printer cannot recognize print data, causing a print error. In normal cases, when a printer is purchased, a printer driver that performs conversion into a PDL corresponding to the printer is included in a recording medium (such as a compact disc read only memory (CD-ROM)), and a print error caused by a mismatch between the PDL corresponding to the printer and the PDL of the printer driver does not occur. In contrast, when a user installs a printer driver distributed from a Web server, there is a necessity to select and download a printer driver with a PDL corresponding to the printer.

The printer may support a plurality of PDLs. In this case, the user can select a printer driver with any PDL out of the supported PDLs and install the printer driver. However, available functions for printing may differ for each printer driver that performs conversion into each PDL. The available functions for printing supported by the printer driver often depend on the type of the printer or the PDL. For this reason, focusing attention on the transfer (carry-over) of print settings, a printer driver that performs conversion into a different PDL is highly likely not to be able to be installed with the print settings transferred (carried over). In contrast, a printer driver that performs conversion into the same PDL is highly likely to be able to be installed with the print settings transferred. In the case of Windows, for example, when a new printer replaces an old printer, the user normally deletes a printer icon of the old printer to delete a printer driver of the old printer and then installs a new printer driver. In this case, print setting information of the printer driver of the old printer is discarded. However, in order to avoid this situation, Windows includes a function that enables the new printer driver to be selected or installed with the print settings of the printer driver associated with the printer icon transferred by an operation by the user.

Although the foregoing describes manually selecting and installing the new printer driver, a system is developed that acquires a printer driver based on system information of a client and inherent information of a printing apparatus and transmits the printer driver together with installation information to the client, thereby enabling a printer driver optimum for an environment of the client to automatically be installed (refer to Japanese Patent Application Laid-open No. 2007-086969).

However, although the system disclosed in Japanese Patent Application Laid-open No. 2007-086969 enables the client to install the optimum printer driver when replacing a printer, the system has a problem in that print settings of an existing printer driver cannot appropriately be transferred.

SUMMARY OF THE INVENTION

According to one aspect of the present invention, an information processing apparatus includes a communication unit configured to communicate with a server, a detector configured to detect whether a first printer serving as a connection destination of an installed first driver has been changed to a second printer, an information acquirer configured to, when the detector detects that the first printer has been changed, acquire from the first driver first information that is information on the first driver and acquire from the second printer second information that is information on the second printer, an inquirer configured to transmit an inquiry request to request information on a driver for the second printer together with the first information and the second information to the server via the communication unit, and receive inquiry result information that is a response to the inquiry request and that includes the information on the driver for the second printer, a decider configured to determine a second driver to be installed from drivers indicated by the inquiry result information, a driver acquirer configured to acquire the second driver from the server via the communication unit, and an installer configured to carry over print settings of the first driver to install the second driver acquired by the driver acquirer.

BRIEF DESCRIPTION OF THE DRAWINGS

FIG. 10 is a diagram of an example of a driver list of a specific device.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
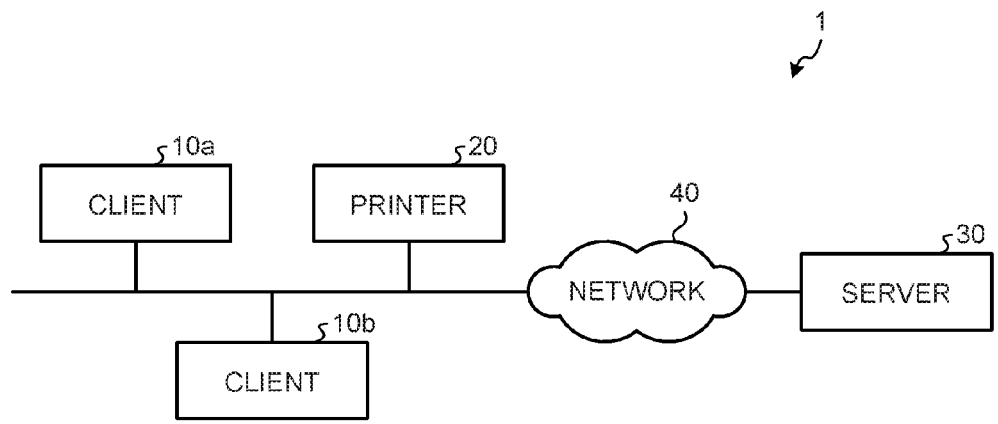
FIG. 1 is a diagram of an example of an overall configuration of an installation system according to a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

The following describes embodiments of a computer program, an information processing apparatus, an installation system, and a method of installation according to the present invention in detail with reference to FIGS. 1 through 15. The present invention is not limited by the following embodiments, and components in the following embodiments include ones that those skilled in the art can easily think of, substantially the same ones, and ones of what is called the range of equivalence. Furthermore, various omissions, replacements, modifications, and combinations can be made to the components without departing from the essence of the following embodiments.

First Embodiment

Overall Configuration of Installation System

FIG. 1 is a diagram of an example of an overall configuration of an installation system according to a first embodiment. The following describes an outline of an overall configuration of this installation system 1 with reference to FIG. 1.

As illustrated in FIG. 1, the installation system 1 is a system of what is called a point and print environment including clients 10a and 10b, a printer 20, and a server 30. The clients 10a and 10b and the printer 20 are connected with each other in a communicable manner via a local area network (LAN), for example, and the LAN is communicable with the server 30 via a network 40. Although the installation system 1 includes the two clients (the clients 10a and 10b) in FIG. 1, this is not limiting; one or three or more clients may be included. When any client in the clients 10a and 10b is indicated, or when they are collectively referred to, it or they will be referred to simply as a "client 10".

The client 10 is an information processing apparatus, which is a general-purpose computer such as a PC, that transmits print data that requests printing to the printer 20 and causes the printer 20 to print the print data or receives a printer driver from the server 30 via the network 40.

The printer 20 is an image forming apparatus that receives and prints out the print data converted into a PDL by the client 10. The printer 20 may be an image forming apparatus including a printing function and may be a multifunction peripheral (MFP) including at least two functions out of a copying function, a printer function, a scanner function, and a facsimile function, for example. Although the printer 20 directly receives the print data from the client 10 in the example in FIG. 1, the print data may be received via a print server.

The server 30 is a server apparatus that stores therein printer drivers corresponding to various printers and information on these printer drivers.

The network 40 is a network such as a local area network (LAN), a wide area network (WAN), or the Internet. The network 40 performs data communication on a communication protocol such as Transmission Control Protocol/Internet Protocol (TCP/IP).

Hardware Configuration of Client and Server

Figure 2:
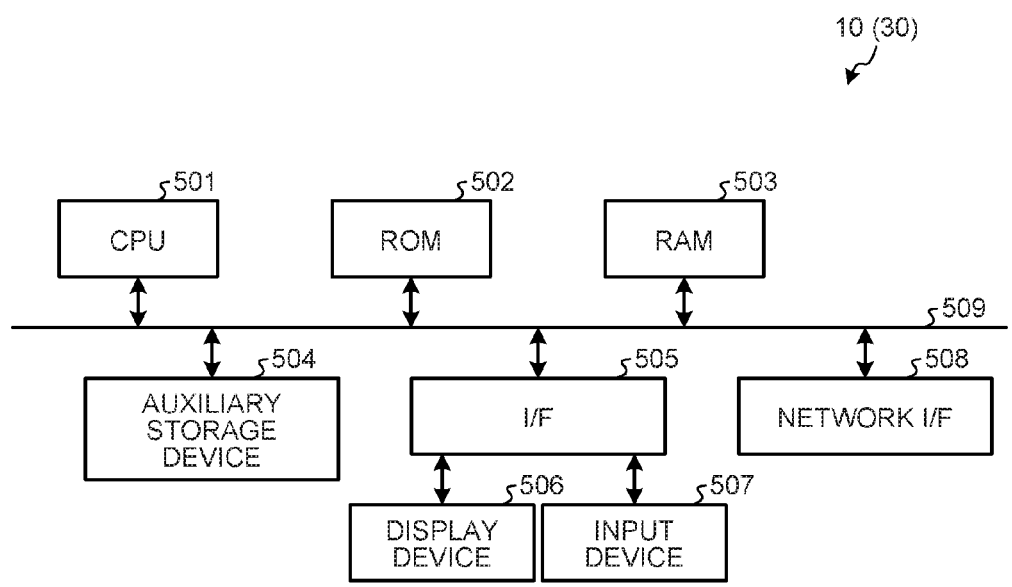
FIG. 2 is a diagram of an example of a hardware configuration of a client and a server.

FIG. 2 is a diagram of an example of a hardware configuration of a client and a server. The following describes a hardware configuration of the client 10 and the server 30 with reference to FIG. 2.

First, the following describes the hardware configuration of the client 10 with reference to FIG. 2. As illustrated in FIG. 2, the client 10 includes a CPU 501, a ROM 502, a RAM 503, an auxiliary storage device 504, an I/F 505, a display device 506, an input apparatus 507, and a network I/F 508.

The CPU 501 is an apparatus that controls the operation of the entire client 10. The ROM 502 is a non-volatile storage device that stores therein computer programs such as firmware for the client 10. The RAM 503 is a volatile storage device used as a work area of the CPU 501.

The auxiliary storage device 504 is a storage device such as a hard disk drive (HDD) or a solid state drive (SSD) that stores therein an operating system (OS), application programs, and various kinds of data. The I/F 505 is an interface for connecting various apparatuses and a bus 509.

The display device 506 is a display device such as a liquid crystal display (LCD), a plasma display, or an organic electro-luminescence (EL) display that displays various kinds of information such as a cursor, menus, windows, letters, and images. The input apparatus 507 is an input apparatus such as a mouse or a keyboard for performing operations such as receiving input of letters, numbers, and the like, selecting various kinds of instructions, and moving the cursor.

The network I/F 508 is an interface for communicating data via the network 40.

The CPU 501, the ROM 502, the RAM 503, the auxiliary storage device 504, the I/F 505, and the network I/F 508 are connected with each other in a communicable manner with the bus 509 such as an address bus or a data bus.

The computer programs for the client 10 may be recorded and distributed in a computer-readable recording medium such as a CD-ROM, a compact disc recordable (CD-R), a digital versatile disc (DVD), or a Blu-ray disc as an installable or executable file.

The server 30 has a hardware configuration similar to that of the client 10, and a description thereof is omitted. However, the ROM 502 and the auxiliary storage device 504 store therein various kinds of computer programs for the server 30 for controlling the server 30. Also in this case, the computer programs for the printer 20 may be recorded and distributed in a computer-readable recording medium such as a CD-ROM as an installable or executable file.

Print Settings of Printer Driver

Figure 3:
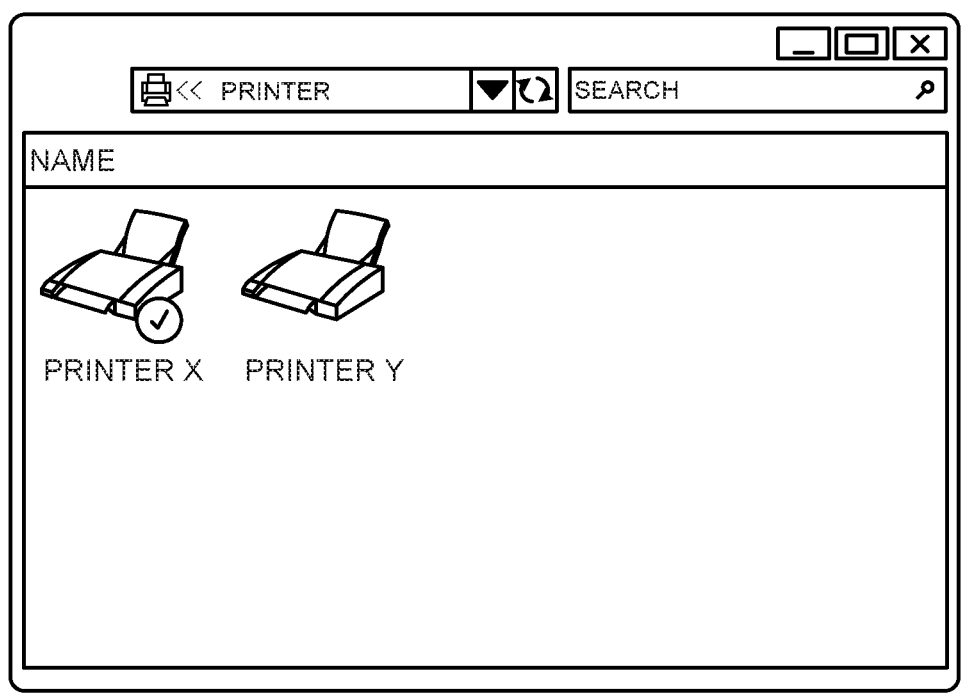
FIG. 3 is a diagram illustrating an example of a printer screen.
Figure 4:
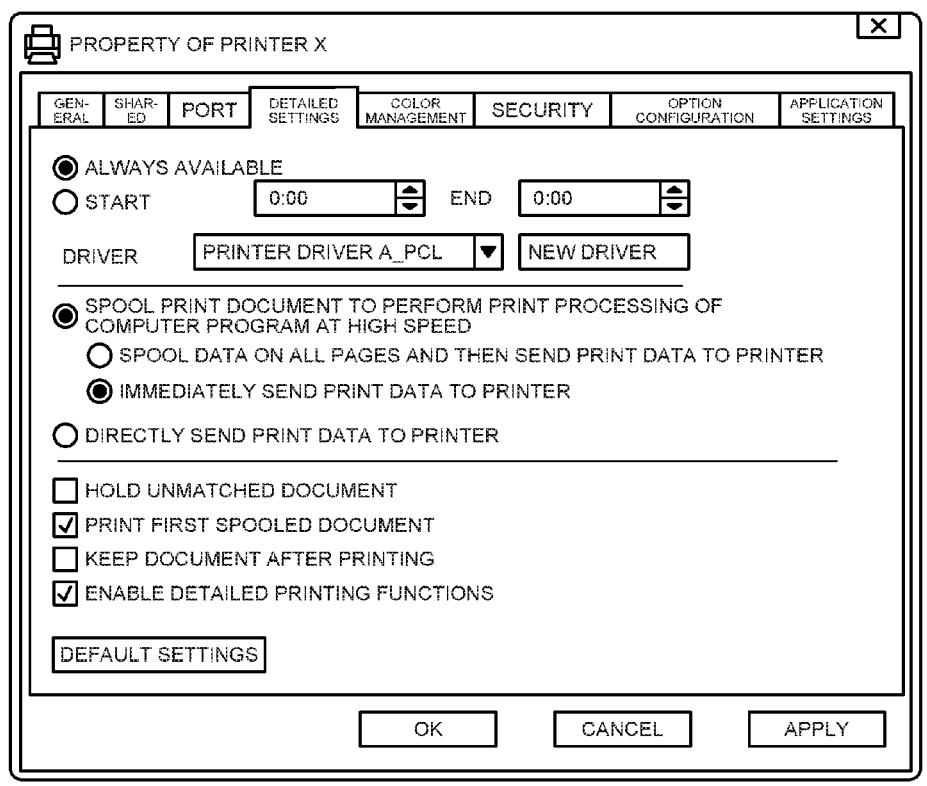
FIG. 4 is a diagram of an example of a screen of print settings of a printer driver.
Figure 5:
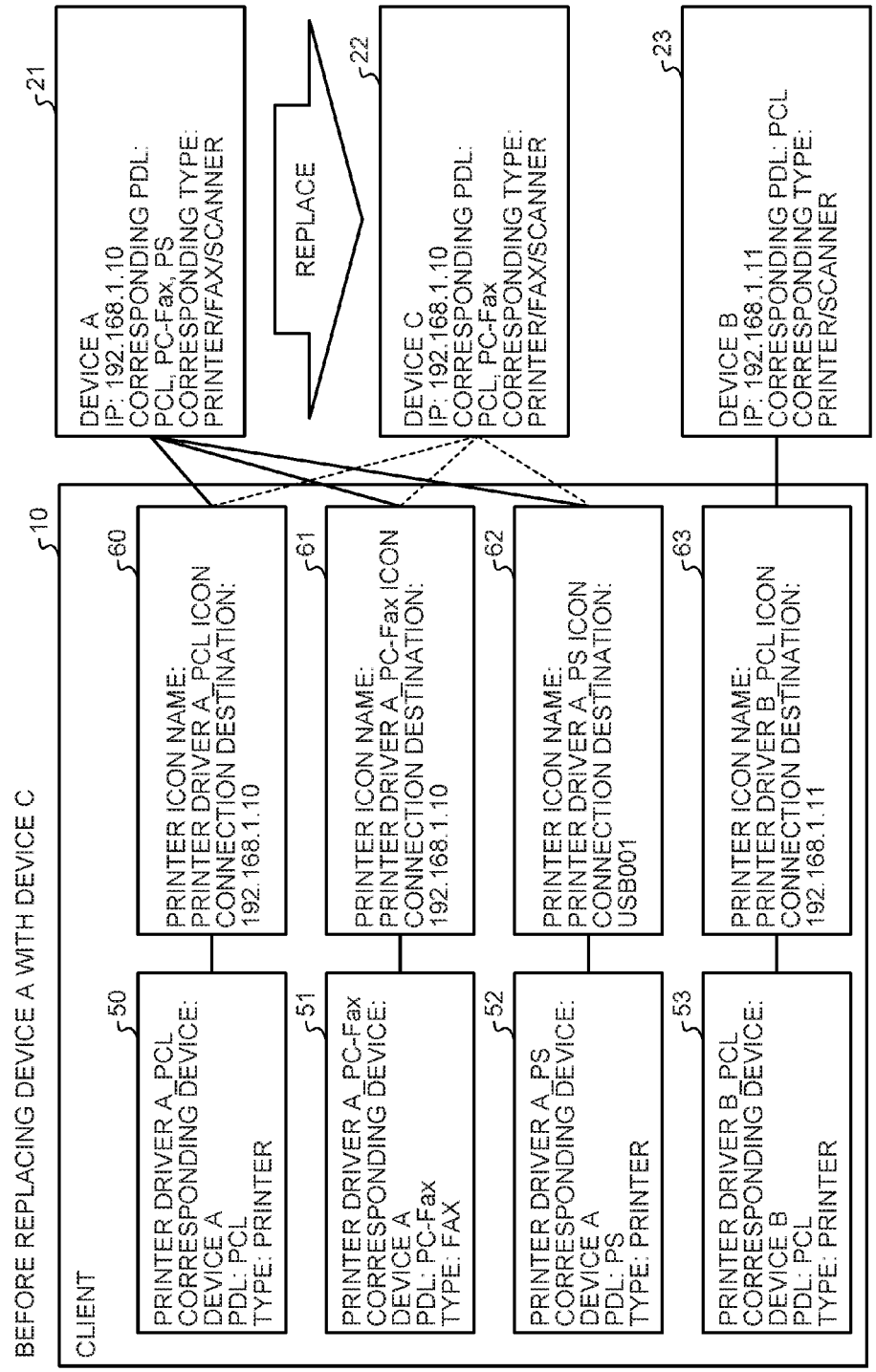
FIGS. 5A and 5B are diagrams briefly illustrating a printer driver installation operation in an information processing apparatus according to the first embodiment.

FIG. 3 is a diagram illustrating an example of a printer screen. FIG. 4 is a diagram of an example of a screen of print settings of a printer driver. The following describes an outline of the print settings of the printer driver with reference to FIGS. 3 and 4.

In a PC with Windows installed as an OS, when a printer driver for controlling a printer is installed, for example, a printer icon (a logical printer) indicating a printer to be controlled by the printer driver is indicated as in the printer screen illustrated in FIG. 3. A user performs an operation (e.g., a right click) on the printer icon with a mouse serving as the input apparatus 507, whereby a property screen illustrated in FIG. 4 is displayed. FIG. 4 illustrates a screen of a "detailed settings" tab in particular in the property screen. The user can perform print settings of the printer driver in this property screen.

The print settings of the printer driver include "basic settings" that can be set in a "general" tab of the property screen of the printer driver and "default settings" present in the "detailed settings" (refer to FIG. 4) tab. "Basic settings" in the print settings can be set for each user. When there are a plurality of user accounts in the same PC, "default settings" in the print settings are set commonly for all the users. In the specification of Windows, information on these print settings is stored in a specific path of a registry stored in a system drive included in the auxiliary storage device 504. When "basic settings" in the print settings are once set by the user, printing is performed on the print settings of the set "basic settings" when printing is performed by an application after that. When printing is performed by an application without "basic settings" set by the user, printing is performed on the print settings of "default settings" as an alternative to "basic settings."

As illustrated in FIG. 4, the "detailed settings" tab includes a "new driver" button. When the user presses this button, a printer driver (a currently used printer driver) associated with the printer icon selected to open the property screen can be changed to be set to another printer driver. When a printer driver having the same name as that of the currently used printer driver is selected by the pressing of the "new driver" button, for example, the printer driver is updated, and both "basic settings" and "default settings" in the print settings are transferred as the print settings of the updated printer driver. In contrast, a printer driver having a name different from that of the currently used printer driver is selected by the pressing of the "new driver" button, the currently used printer driver is changed to the selected printer driver, and "basic settings" are not transferred, although "default settings" in the print settings are transferred. Consequently, when the currently used printer driver is changed, the printer icon selected to open the property screen is associated with the changed printer driver. In other words, the printer icon associated with the replaced, old printer driver does not remain. With this operation, a situation can be prevented in which the user erroneously performs printing with the printer icon associated with the replaced, old printer driver to cause a print error.

Although operations are illustrated in FIG. 3 and FIG. 4 in which when the setting of the printer driver is manually changed, the original printer icon is associated with the new printer driver, and the printer icon associated with the replaced, old printer driver does not remain, this is not limiting. In other words, a printer icon associated with the new printer driver the setting of which has been changed may be newly created, and the printer icon associated with the replaced, old printer driver may remain as it is and may manually be deleted by the user appropriately. An installation operation in which a printer driver is automatically installed in the installation system 1 according to the present embodiment described below will be described with the original printer icon associated with the new printer driver and with the printer icon associated with the replaced, old printer driver not remaining.

Outline of Installation Operation of Installation System

FIGS. 5A and 5B are diagrams briefly illustrating a printer driver installation operation in an information processing apparatus according to the first embodiment. The following describes an outline of a printer driver installation operation of the installation system 1 according to the present embodiment with reference to FIGS. 5A and 5B.

First, the user is assumed to be currently using a device 21 and a device 23 supporting a plurality of PDLs as devices used from the client 10. The device 21 is assumed to be a multifunction peripheral with a device name of "Device A", an IP address of "192.168.1.10", corresponding PDLs of "PCL", "PC-FAX", and "PostScript (PS)", and corresponding types (functions) of "printer", "fax", and "scanner". The device 23 is assumed to be a multifunction peripheral with a device name of "Device B", an IP address of "192.168.1.11", a corresponding PDL of "PCL", and corresponding types (functions) of "printer" and "scanner". As illustrated in FIG. 5A, printer drivers 50 to 52 are assumed to be installed in the client 10 as printer drivers corresponding to the device 21. A printer driver 53 is assumed to be installed in the client 10 as a printer driver corresponding to the device 23.

The printer driver 50 is a driver with a printer driver name of "Printer Driver A_PCL", a corresponding device of "Device A", a PDL to be converted of "PCL", and a type (function) of "printer". The printer driver 51 is a driver with a printer driver name of "Printer Driver A_PC-Fax", a corresponding device of "Device A", a PDL to be converted of "PC-Fax", and a type (function) of "fax". The printer driver 52 is a driver with a printer driver name of "Printer Driver A_PS", a corresponding device of "Device A", a PDL to be converted of "PS", and a type (function) of "printer". The printer drive 53 is a driver with a printer driver name of "Printer Driver B_PCL", a corresponding device of "Device B", a PDL to be converted of "PCL", and a type (function) of "printer".

A printer icon associated with the printer driver 50 that controls the device 21 as a printer is assumed to be a printer icon 60. A printer icon name of the printer icon 60 is assumed to be "Printer Driver A_PCL Icon". A printer icon associated with the printer driver 51 that controls the device 21 as a fax is assumed to be a printer icon 61. A printer icon name of the printer icon 61 is assumed to be "Printer Driver A_PC-Fax Icon". A printer icon associated with the printer driver 52 that controls the device 21 as a printer and uses "USB001" as a universal serial bus (USB) port as a connection destination port with the device 21 is assumed to be a printer icon 62. A printer icon name of the printer icon 62 is assumed to be "Printer Driver A_PS Icon". A printer icon associated with the printer driver 53 that controls the device 23 as a printer is assumed to be a printer icon 63. A printer icon name of the printer icon 63 is assumed to be "Printer Driver B_PCL Icon".

The user is assumed to newly purchase a device 22 with a device name of "Device C" and replace the device 21 with the device 22 with the same IP address assigned. In this situation, a device as a new connection destination of the printer icons (the printer icons 60 to 62) associated with the device 21 (device name: "Device A"), that is, an associated device is the device 22 (device name: "Device C"). When there is compatibility between the printer driver of the device 21 and the printer driver of the device 22, even when printing is executed on the device 22 with the printer driver of the device 21, the printing succeeds, whereas when there is no compatibility therebetween, a print error occurs, and there is a necessity to install a printer driver for the device 22 in the client 10. Even when there is compatibility therebetween, when the device 22 has a new function that is not included in the device 21, the new function cannot be used by the printer driver of the device 21.

The client 10 of the installation system 1 according to the present embodiment detects that a connection destination device of the printer driver has been changed and downloads a printer driver corresponding to the changed device 22 (device name: "Device C") from the server 30 (refer to FIG. 1) and installs the printer driver so as not to cause a print error. In this situation, the client 10 downloads and installs an appropriate printer driver based on the following information (1) to (3) and the like.

(1) Information on the corresponding device, the PDL, and the type (function) of the current printer driver (2) Information on the corresponding PDL and the corresponding type (function) of the replaced device (3) Information on architecture of the CPU (x86/x64)

Although the manner that the client 10 detects that the device as the connection destination of the printer driver has been changed is the detection by communication with the new device 22 having the same IP address as that of the replaced device 21 as illustrated in FIGS. 5A and 5B, this is not limiting. The client 10 may detect that the device as the connection destination of the printer driver has been changed by the fact that the setting of the connection destination port of the currently used printer has been changed by the user, for example. Alternatively, the client 10 may detect that the device as the connection destination of the printer driver has been changed by the fact that a printer driver corresponding to the new device has been installed by the user when the new device is introduced.

As illustrated in FIG. 5B, when the device 21 is replaced with the device 22 with the same IP address set, if the device 22 corresponds to the same PDL as those of the existing printer drivers (the printer drivers 50 to 53), the client 10 installs the printer driver of the same PDL. In this case, it is highly likely that the print settings of the old printer driver will be transferred to the print settings of the new printer driver. In contrast, if the device 22 does not correspond to the same PDL as those of the existing printer drivers (the printer drivers 50 to 53), the client 10 installs a printer driver of the same type (function).

In the example in FIG. 5B, the device 22 corresponds to "PCL" as the PDL of the printer driver 50, and therefore the client 10 installs a printer driver 50a having the same PDL as the printer driver for the device 22. In this case, the original printer icon 60 is newly associated with the printer driver 50a and the device 22 and is replaced as a printer icon 60a. The device 22 corresponds to "PC-Fax" as the PDL of the printer driver 51, and therefore the client 10 installs a printer driver 51a having the same PDL as the printer driver for the device 22. In this case, the original printer icon 61 is newly associated with the printer driver 51a and the device 22 and is replaced as a printer icon 61a. In contrast, the device 22 does not correspond to "PS" as the PDL of the printer driver 52, and therefore the client 10 installs a printer driver 52a with "PCL" that is the same type (function) ("printer"), is a different PDL, and is a PDL corresponding to the device 22 as the printer driver for the device 22. In this case, the original printer icon 62 is newly associated with the printer driver 52a and the device 22 and is replaced as a printer icon 62a. Although the existing printer drivers 50 to 52 are left (remain installed) in FIG. 5B, they may be deleted (uninstalled).

When installing a new printer driver, the client 10 transfers the print settings of the old printer driver as the print settings of the new printer driver if possible.

Although the printer driver 52 uses the USB port as the connection destination port of the device 21 in the example in FIGS. 5A and 5B, when a LAN port for an IP address of "192.168.1.10", not the USB port, is assumed to be used similarly to the printer driver 50, for example, as a result of the replacement with the device 22, both the printer drivers 50a and 52a have "PCL" as the PDL and the LAN port as the connection destination port. In this case, the client 10 may cause the display device 506 to display an inquiry to the user as to whether the printer icons 60a and 62a associated with the printer drivers 50a and 52a, respectively, are created.

Functional Block Configuration of Client

Figure 6:
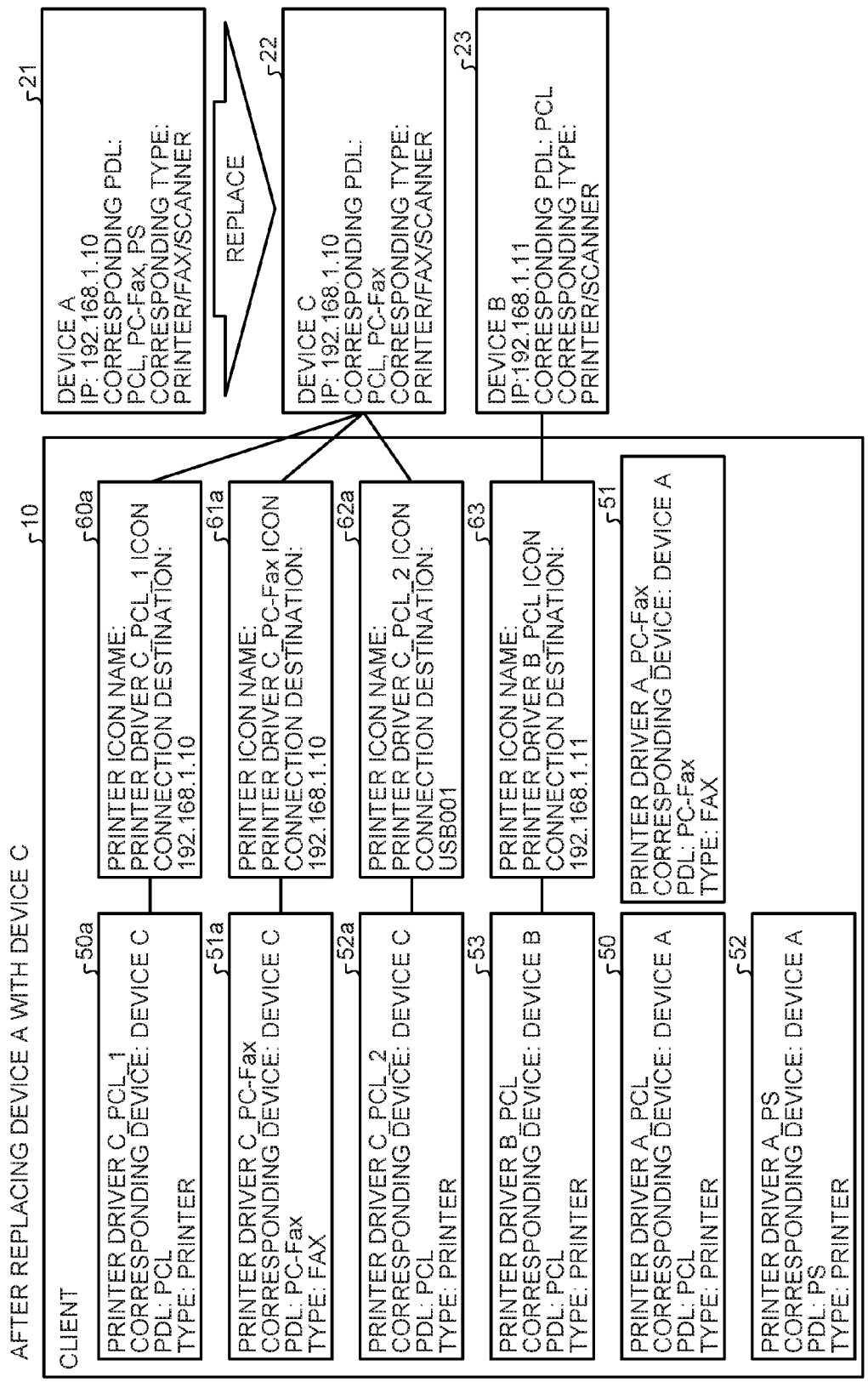
FIG. 6 is a diagram of an example of a functional block configuration of the client according to the first embodiment.
Figure 7:
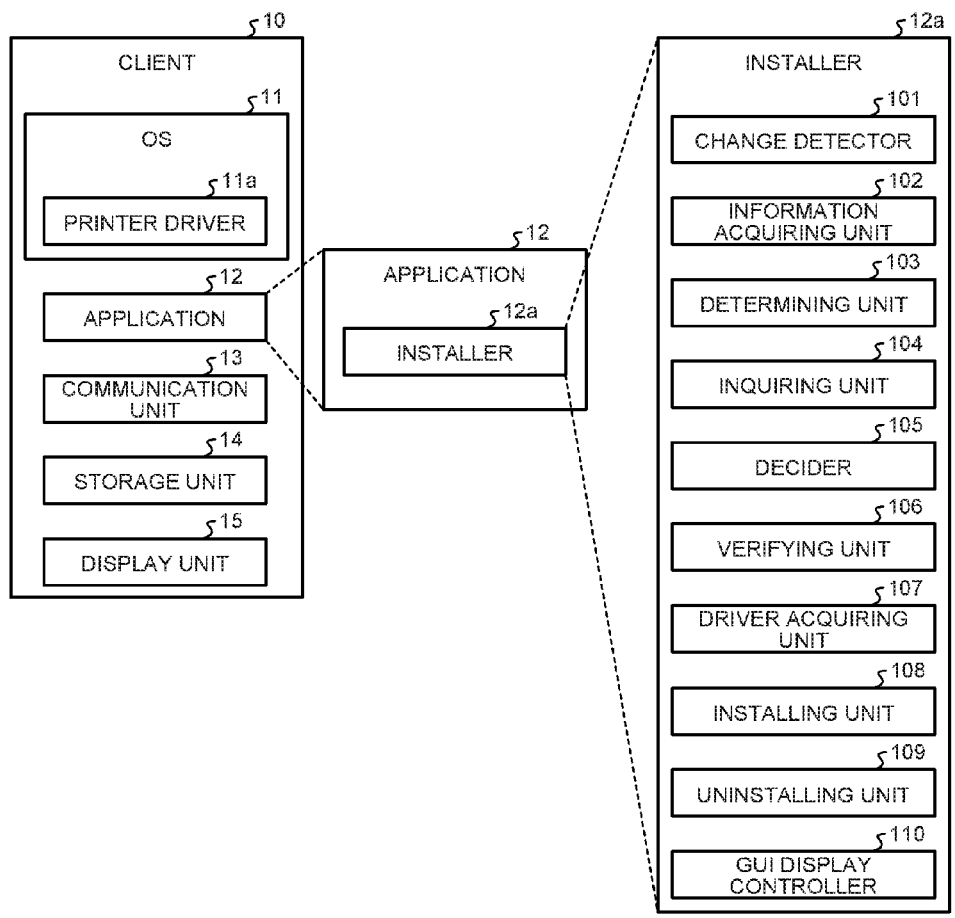
FIG. 7 is a diagram of an example of driver information.
Figures 8, 9:
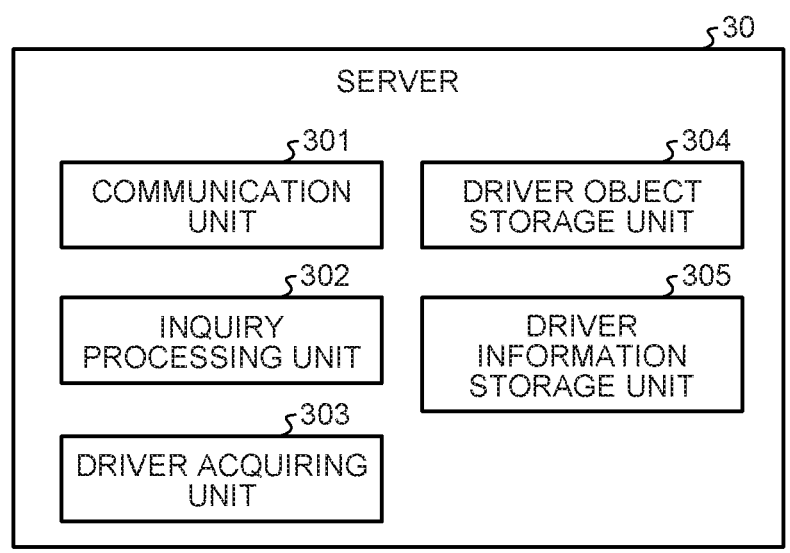
FIG. 8 is a diagram of an example of connection destination information.
FIG. 9 is a diagram of an example of a functional block configuration of the server of the first embodiment.

FIG. 6 is a diagram of an example of a functional block configuration of the client according to the first embodiment. FIG. 7 is a diagram of an example of driver information. FIG. 8 is a diagram of an example of connection destination information. The following describes the operation and a functional block configuration of the client 10 of the installation system 1 with reference to FIGS. 6 to 8.

As illustrated in FIG. 6, the client 10 includes an OS 11 and an application 12 that are installed and further includes a communication unit 13, a storage unit 14, and a display unit 15.

The OS 11 is basic software such as Windows and controls the operation of a computer program such as the application 12. The OS 11 includes a printer driver 11a. The printer driver 11a is software that controls the operation of the printer 20 connected to the client 10. When the printer 20 corresponds to a plurality of PDLs as illustrated in FIGS. 5A and 5B, a plurality of printer drivers 11a may be provided. The printer driver 11a may control a plurality of printers 20. The printer driver 11a can thus be present in a variety of manners in the client 10, and the printer driver 11a to be replaced and a new printer driver that replaces the printer driver 11a in the following installation operation of the installation system 1 will be expressed simply as a "printer driver".

The application 12 is a computer program that generates print data and instructs the printer 20 to execute printing out. The application 12 includes an installer 12a.

The installer 12a is a computer program that installs a printer driver for controlling the operation of the printer 20 in the client 10 in order to cause the printer 20 to perform printing out by the application 12. In this example, the installer 12a functions as a resident application. The installer 12a is executed by the CPU 501 illustrated in FIG. 2, thereby implementing a change detector 101 (a detector), an information acquiring unit 102, a determining unit 103, an inquiring unit 104, a decider 105, a verifying unit 106, a driver acquiring unit 107, an installing unit 108, an uninstalling unit 109, and a graphical user interface (GUI) display controller 110.

The communication unit 13 is a functional unit that performs data communication with the printer 20 and the server 30. The communication unit 13 is implemented by the network I/F 508 illustrated in FIG. 2.

The storage unit 14 is a functional unit that stores therein the OS 11 as software, the application 12, and various kinds of data such as print data. The storage unit 14 is implemented by the auxiliary storage device 504 illustrated in FIG. 2.

The display unit 15 is a functional unit that displays GUIs and the like by causing the OS 11 and the application 12 to be executed. The display unit 15 is implemented by the display device 506 illustrated in FIG. 2.

The change detector 101 is a functional unit that detects that a printer as a connection destination of an existing printer driver (a printer controlled by the printer driver) has been changed. The installer 12*a* functions as the resident application as described above, and the change detector 101 always detects whether the printer has been changed.

The information acquiring unit 102 is a functional unit that, if a change of the printer (a first printer) as the connection destination of the existing printer driver (a first printer driver) is detected by the change detector 101, acquires from the existing printer driver information (first information) as information on the printer driver and acquires from a newly replaced printer (a second printer) connection destination information (second information) as information on the printer. As illustrated in FIG. 7, the driver information includes pieces of information on "driver name", "printer icon name", "PDL", "type (function)", "architecture", and "corresponding device name", for example. As illustrated in FIG. 8, the connection destination information includes pieces of information on "device name", "corresponding PDL", and "corresponding type (corresponding function)", for example.

The determining unit 103 is a functional unit that determines whether "corresponding device name" of the driver information and "device name" of the connection destination information acquired by the information acquiring unit 102 are different from each other, and if they are different from each other, determines the existing printer driver for which the driver information has been acquired to be an object to be replaced.

The inquiring unit 104 is a functional unit that, if it is determined that the existing printer driver is the object to be replaced by the determining unit 103, transmits an inquiry request that requests information on a printer driver corresponding to the changed printer together with the driver information and the connection destination information acquired by the information acquiring unit 102 to the server 30 via the communication unit 13. The inquiring unit 104 receives inquiry result information as a response to the inquiry request from the server 30 via the communication unit 13. The inquiry result information is a list of printer drivers corresponding to the changed printer, for example, and includes pieces of information on "driver name", "PDL", "type", "architecture", "compatibility of print settings", and "driver acquisition uniform resource locator (URL)".

The decider 105 is a functional unit that determines a printer driver (a second driver) to be installed from the printer drivers indicated by the inquiry result information received by the inquiring unit 104.

The verifying unit 106 is a functional unit that verifies whether the printer driver determined by the decider 105 has been installed in the client 10.

The driver acquiring unit 107 is a functional unit that, if it is verified that the printer driver determined by the decider 105 has not been installed by the verifying unit 106, transmits a driver request that requests the printer driver to the server 30 via the communication unit 13 based on "driver acquisition URL" corresponding to the printer driver from the inquiry result information. The driver acquiring unit 107 acquires (downloads) the printer driver as a response to the driver request from the server 30 via the communication unit 13.

The installing unit 108 is a functional unit that installs the printer driver acquired by the driver acquiring unit 107 in the client 10. When the inquiry result information indicates that "compatibility of print settings" for the installed printer driver is present, the installing unit 108 transfers the print settings of the printer driver to be replaced (the above-described "default settings" and "basic settings") as the print settings of the installed, new printer driver. Having compatibility of print settings refers to a case that satisfies the following Condition 1 and Condition 2 when the print settings of the print driver to be replaced are applied to the new printer driver, for example.

Condition 1: Causing no error when a print setting screen is opened or printing is executed by the transfer of the print settings.

Condition 2: When the print settings of the printer driver to be replaced and the print settings of the new printer driver have a common function, the print settings of the printer driver to be replaced about the common function being included in the print settings of the new printer driver.

The uninstalling unit 109 is a functional unit that uninstalls the old printer driver to be replaced after the new printer driver is installed by the installing unit 108. The installer 12*a* does not necessarily include the uninstalling unit 109. In other words, the old printer driver to be replaced is not necessarily uninstalled. However, including the uninstalling unit 109 can delete an unnecessary printer driver and can thereby avoid the capacity of the auxiliary storage device 504 being tight.

The GUI display controller 110 is a functional unit that causes the display unit 15 to display necessary information about the printer driver installation operation by the installer 12*a*. When the printer driver to be installed in the client 10 has not been determined from the inquiry result information by the decider 105, the GUI display controller 110 causes the display unit 15 to display a warning message indicating the fact, for example. In this case, the GUI display controller 110 causes the display unit 15 to display the fact that no appropriate printer driver is found, the possibility that a print error may occur if printing is executed like this, prompting the user to install an appropriate printer driver, or the like as the warning message, for example.

Concerning the change detector 101, the information acquiring unit 102, the determining unit 103, the inquiring unit 104, the decider 105, the verifying unit 106, the driver acquiring unit 107, the installing unit 108, the uninstalling unit 109, and the GUI display controller 110, their functions are conceptually illustrated, and such configurations are not limiting. A plurality of functional units illustrated as independent functional units in FIG. 6 may be configured as one functional unit, for example. On the contrary, a function possessed by one functional unit in FIG. 6 may be divided into a plurality of ones to be configured as a plurality of functional units.

Functional Block Configuration of Server

FIG. 9 is a diagram of an example of a functional block configuration of the server of the first embodiment. FIG. 10 is a diagram of an example of a driver list of a specific device. The following describes a functional block configuration of the server 30 of the installation system 1 with reference to FIGS. 9 and 10.

As illustrated in FIG. 9, the server 30 includes a communication unit 301, an inquiry processing unit 302 (a compatibility determining unit), a driver acquiring unit 303, a driver object storage unit 304, and a driver information storage unit 305.

The communication unit 301 is a functional unit that performs data communication with the client 10. The communication unit 301 is implemented by the network I/F 508 illustrated in FIG. 2.

When receiving the inquiry request from the client 10 via the communication unit 301, the inquiry processing unit 302 generates the inquiry result information as the list of the printer drivers corresponding to the printer changed by the client 10 based on the driver information and the connection destination information received together with the inquiry request and transmits the inquiry result information as a response to the inquiry request to the client 10 via the communication unit 301. Specifically, the inquiry processing unit 302 first reads information on printer drivers that can be applied to the printer (the printer changed by the client 10) indicated by "device name" of the connection destination information from the driver information storage unit 305 and creates a list (a driver list) as illustrated in FIG. 10, for example. In the example illustrated in FIG. 10, the driver list includes pieces of information on "driver name" of each driver, "(corresponding) device name", "type", "PDL", "version", "architecture", "driver acquisition URL", and "compatibility of print settings". Next, the inquiry processing unit 302 determines whether the print settings of the printer driver to be replaced in the client 10 can be transferred for each of the printer drivers listed in the driver list and writes a determination result in the column "compatibility of print settings" of the driver list as illustrated in FIG. 10. Furthermore, the inquiry processing unit 302 extracts printer drivers that match in all items of "device name", "PDL", and "type" indicated by the connection destination information and "architecture" indicated by the driver information from the driver list and generates inquiry result information that lists the extracted printer drivers.

The driver acquiring unit 303 is a functional unit that, if receiving the driver request from the client 10 via the communication unit 301, acquires the printer driver indicated by the driver request from the driver object storage unit 304. The driver acquiring unit 303 transmits the acquired printer driver as a response to the driver request to the client 10 via the communication unit 301.

The driver object storage unit 304 is a functional unit that stores therein various kinds of drivers for controlling the devices. The driver object storage unit 304 is implemented by the auxiliary storage device 504 illustrated in FIG. 2.

The driver information storage unit 305 is a functional unit that stores therein information on the various kinds of drivers. The driver information storage unit 305 is implemented by the auxiliary storage device 504 illustrated in FIG. 2.

The inquiry processing unit 302 and the driver acquiring unit 303 are implemented by causing the CPU 501 to execute the computer programs stored in the auxiliary storage device 504 illustrated in FIG. 2.

Concerning the communication unit 301, the inquiry processing unit 302, the driver acquiring unit 303, the driver object storage unit 304, and the driver information storage unit 305, their functions are conceptually illustrated, and such configurations are not limiting. A plurality of functional units illustrated as independent functional units in FIG. 9 may be configured as one functional unit, for example. On the contrary, a function possessed by one functional unit in FIG. 9 may be divided into a plurality of ones to be configured as a plurality of functional units.

Printer Driver Install Operation in Installation System

Figure 11:
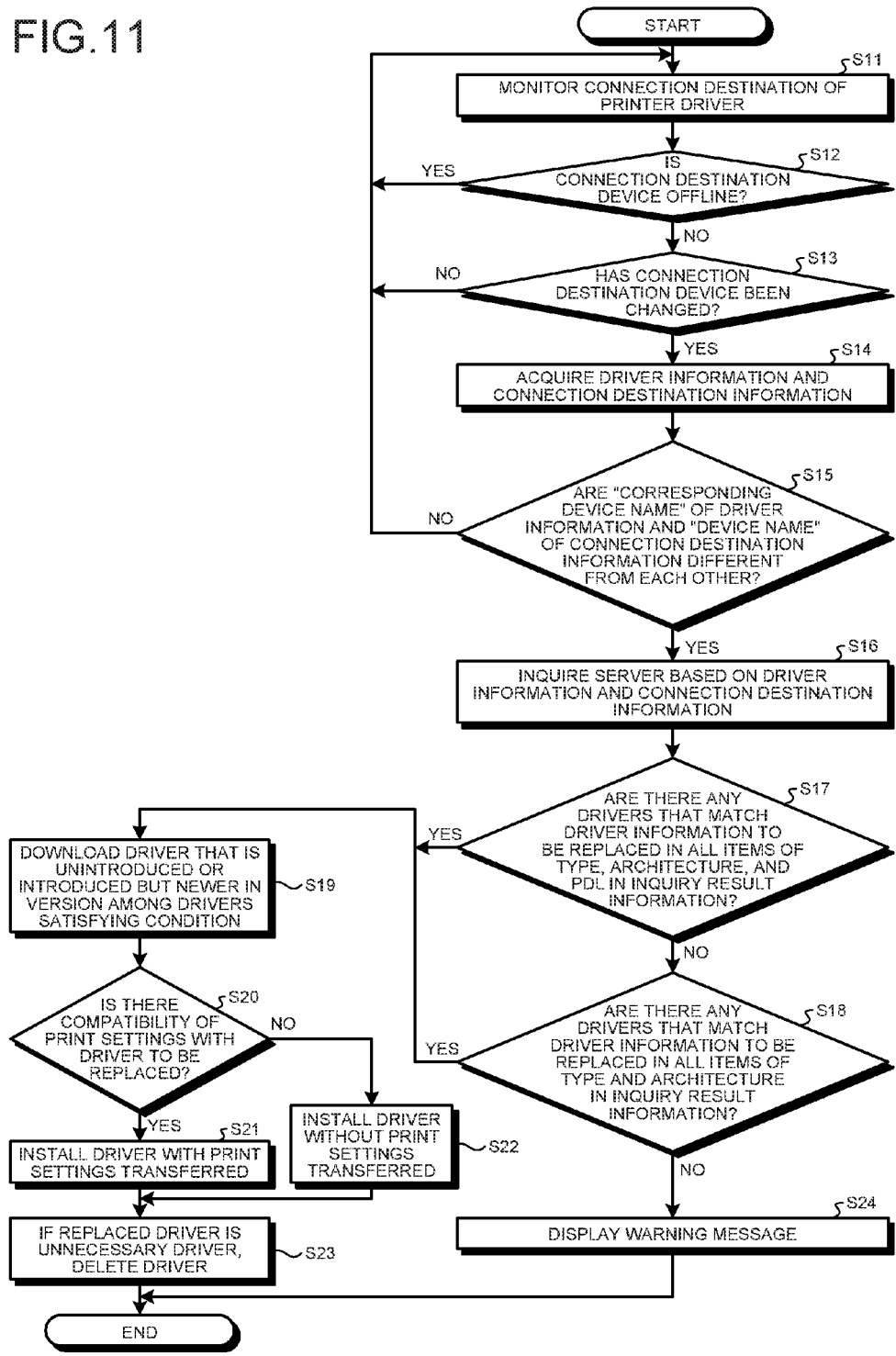
FIG. 11 is a flowchart of an example of a printer driver installation operation in the installation system according to the first embodiment.

FIG. 11 is a flowchart of an example of a printer driver installation operation in the installation system according to the first embodiment. The following describes a procedure of a printer driver installation operation in the installation system 1 with reference to FIG. 11.

Step S11

The change detector 101 of the installer 12a as a resident application always monitors whether the printer as the connection destination of the existing printer driver has been changed. The process then advances to Step S12.

Step S12

The change detector 101 determines whether the printer as the connection destination of the existing printer driver is offline. If the printer is not offline (No at Step S12), the process advances to Step S13; if the printer is offline (Yes at Step S12), the process returns to Step S11.

Step S13

The change detector 101 detects whether the printer as the connection destination of the existing printer driver has been changed. If it is detected that the printer has been changed (Yes at Step S13), the process advances to Step S14; if the printer has not been changed (No at Step S13), the process returns to Step S11.

Step S14

If the change of the printer as the connection destination of the existing printer driver is detected by the change detector 101, the information acquiring unit 102 acquires from the existing printer driver the driver information as information on the printer driver and acquires from the newly replaced new printer the connection destination information as information on the printer. The process then advances to Step S15.

Step S15

The determining unit 103 determines whether "corresponding device name" of the driver information and "device name" of the connection destination information acquired by the information acquiring unit 102 are different from each other. If they are different from each other (Yes at Step S15), the determining unit 103 determines the existing printer driver for which the driver information has been acquired to be the object to be replaced, and the process advances to Step S16. In contrast, if they are the same (No at Step S15), the process advances to Step S11.

Step S16

If it is determined that the existing printer driver is the object to be replaced by the determining unit 103, the inquiring unit 104 transmits the inquiry request that requests the information on the printer driver corresponding to the changed printer together with the driver information and the connection destination information acquired by the information acquiring unit 102 to the server 30 via the communication unit 13. The inquiring unit 104 receives the inquiry result information as the response to the inquiry request from the server 30 via the communication unit 13. The process then advances to Step S17.

Step S17

The decider 105 determines whether there are any printer drivers that match the printer driver to be replaced in all of "type", "architecture", and "PDL" of the driver information from the printer drivers indicated by the inquiry result information received by the inquiring unit 104. If there are any matching printer drivers (Yes at Step S17), the process advances to Step S19; if there is no matching printer driver (No at Step S17), the process advances to Step S18.

Step S18

The decider 105 determines whether there are any printer drivers that match the printer driver to be replaced in all of "type" and "architecture" of the driver information from the printer drivers indicated by the inquiry result information received by the inquiring unit 104. If there are any matching printer drivers (Yes at Step S18), the process advances to Step S19; if there is no matching printer driver (No at Step S18), the process advances to Step S24.

Step S19

If there is any matching printer driver at Step S17 or S18, the decider 105 determines the printer driver to be the printer driver to be installed. The verifying unit 106 verifies whether the printer driver determined by the decider 105 has been installed (introduced) in (to) the client 10 and whether the printer driver determined by the decider 105 has been installed (introduced) but is newer in version than the printer driver to be replaced. If it is determined that the printer driver determined by the decider 105 has not been installed or has been installed but is newer in version than the printer driver to be replaced by the verifying unit 106, the driver acquiring unit 107 transmits the driver request that requests the printer driver to the server 30 via the communication unit 13 based on "driver acquisition URL" corresponding to the printer driver determined by the decider 105 from the inquiry result information. The driver acquiring unit 107 acquires (downloads) the printer driver as the response to the driver request from the server 30 via the communication unit 13. The process then advances to Step S20.

Step S20

The installing unit 108 determines whether the inquiry result information indicates that "compatibility of print settings" for the printer driver acquired by the driver acquiring unit 107 is present. If "compatibility of print settings" is "present" (Yes at Step S20), the process advances to Step S21; if "compatibility of print settings" is "absent" (No at Step S20), the process advances to Step S22.

Step S21

If the inquiry result information indicates that "compatibility of print settings" for the printer driver acquired by the driver acquiring unit 107 is present, the installing unit 108 installs the new printer driver with the print settings of the printer driver to be replaced (the above-described "basic settings" and "default settings") transferred as the print settings of the acquired, new printer driver. In this case, the printer icon associated with the printer driver to be replaced is associated with a newly installed printer icon. The process then advances to Step S23.

Step S22

If the inquiry result information indicates that "compatibility of print settings" for the printer driver acquired by the driver acquiring unit 107 is absent, the installing unit 108 installs the new printer driver without the print settings of the printer driver to be replaced (the above-described "basic settings" and "default settings") transferred as the print settings of the acquired, new printer driver. In this case, the printer icon associated with the printer driver to be replaced is associated with a newly installed printer icon. The process then advances to Step S23.

Step S23

After the new printer driver is installed by the installing unit 108, if the old printer driver to be replaced is unnecessary, the uninstalling unit 109 uninstalls the old printer driver. The installation operation ends with the foregoing processing.

Step S24

If the printer driver to be installed in the client 10 is not determined from the inquiry result information by the decider 105, the GUI display controller 110 causes the display unit 15 to display a warning message indicating the fact, and the installation operation ends without any new printer driver installed in the client 10.

The foregoing operations at Steps S11 to S24 execute the printer driver installation operation for the client 10 in the installation system 1.

As described above, the client 10 according to the present embodiment detects the change of the printer connected to the existing printer driver, and if detecting it, transmits the inquiry request based on the driver information and the connection destination information to the server 30, receives as the response thereto the inquiry result information as the list of printer drivers that indicates the printer driver corresponding to the changed printer and indicates the presence or absence of the compatibility of print settings, installs a printer driver to which the print settings of the existing driver can be transferred with high possibility from the inquiry result information, and transfers the print settings if possible. With this operation, the new printer driver can automatically be installed with the print settings of the existing printer driver appropriately transferred.

Although the foregoing describes the printer driver as the driver installed in the client 10 and the printer (including the multifunction peripheral) as the device connected to the client 10, they are not limiting. In other words, the driver installed in the client 10 may be a scanner driver, a fax driver, or the like, and the connected device may be a scanner apparatus, a fax apparatus, or the like, in which the above-described operation can also be applied to operations to transfer operation settings of those devices.

Although the inquiry processing unit 302 reads the information on the printer drivers that can be applied to the printer (the printer changed by the client 10) indicated by "device name" of the connection destination information from the driver information storage unit 305 to create the driver list and determines whether the print settings of the printer driver to be replaced in the client 10 can be transferred for each of the printer drivers listed in the driver list, this is not limiting. In other words, the inquiring unit 104 of the client 10 may receive the inquiry result information in which the result of "compatibility of print settings" is not indicated from the server 30, and the decider 105 (the compatibility determining unit) may determine whether the print settings of the printer driver to be replaced in the client 10 can be transferred for each of the printer drivers indicated by the inquiry result information and write a determination result in the column "compatibility of print settings" of the inquiry result information, for example.

Modification

In the installation operation illustrated in FIG. 11, the installer 12a functions as the resident application, and the change detector 101 always detects whether the printer has been changed. The present modification describes a case in which when the user manually starts up the installer 12a, the change detector 101 detects whether the printer has been changed, and the installation operation is executed.

Figure 12:
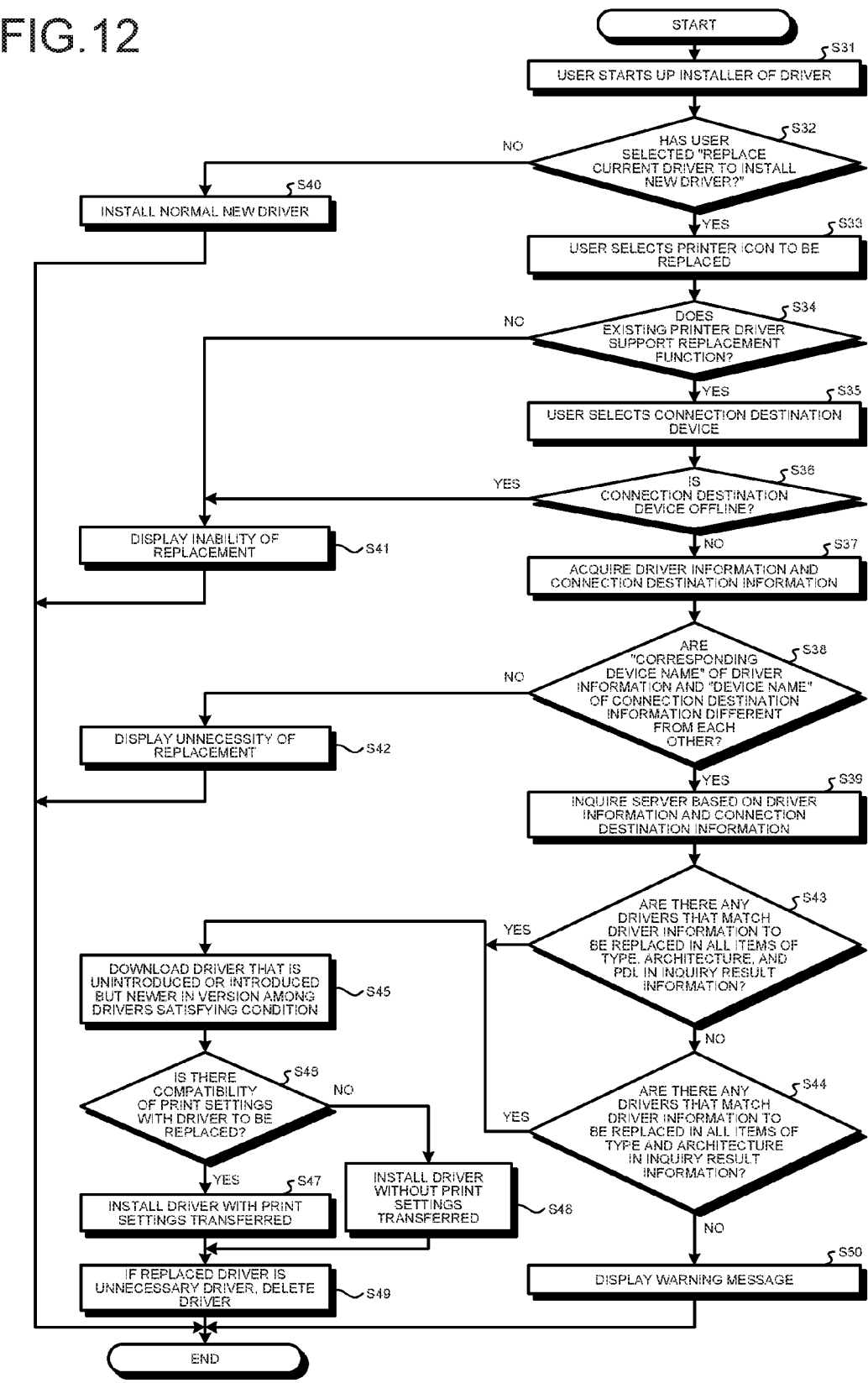
FIG. 12 is a flowchart of an example of a printer driver installation operation in an installation system according to a modification of the first embodiment.

FIG. 12 is a flowchart of an example of a printer driver installation operation in an installation system according to a modification of the first embodiment. The following describes a procedure of a printer driver installation operation in the installation system 1 of the present modification with reference to FIG. 12.

Step S31

The user starts up the installer 12a of the printer driver by an operation on the input apparatus 507. The process then advances to Step S32.

Step S32

If the user selects "replace the current printer driver to install a new printer driver" by an operation on the input apparatus 507 in accordance with an installation sequence of the installer 12a (Yes at Step S32), the process advances to Step S33; if it is not selected (No at Step S32), the process advances to Step S40.

Step S33

The user selects the printer icon associated with the existing printer driver to be replaced by an operation on the input apparatus 507 in accordance with the installation sequence of the installer 12a. The process then advances to Step S34.

Step S34

The change detector 101 determines whether the existing printer driver associated with the printer icon selected by the user supports a replacement function. If the existing printer driver supports the replacement function (Yes at Step S34), the process advances to Step S35; if the existing printer driver does not support the replacement function (No at Step S34), the process advances to Step S41.

Step S35

The user selects a device (printer) as a connection destination by an operation on the input apparatus 507 in accordance with the installation sequence of the installer 12a. The process then advances to Step S36.

Step S36

The change detector 101 determines whether the printer as the connection destination of the existing printer driver is offline. If the printer is not offline (No at Step S36), the process advances to Step S37; if the printer is offline (Yes at Step S36), the process advances to Step S41.

Step S37

If the change of the printer as the connection destination of the existing printer driver is detected by the change detector 101, the information acquiring unit 102 acquires from the existing printer driver the driver information as information on the printer driver and acquires from the newly replaced new printer the connection destination information as information on the printer. The process then advances to Step S38.

Step S38

The determining unit 103 determines whether "corresponding device name" of the driver information and "device name" of the connection destination information acquired by the information acquiring unit 102 are different from each other. If they are different from each other (Yes at Step S38), the determining unit 103 determines the existing printer driver for which the driver information has been acquired to be the object to be replaced, and the process advances to Step S39. In contrast, if they are the same (No at Step S38), the process advances to Step S42.

Step S39

If it is determined that the existing printer driver is the object to be replaced by the determining unit 103, the inquiring unit 104 transmits the inquiry request that requests the information on the printer driver corresponding to the changed printer together with the driver information and the connection destination information acquired by the information acquiring unit 102 to the server 30 via the communication unit 13. The inquiring unit 104 receives the inquiry result information as the response to the inquiry request from the server 30 via the communication unit 13. The process then advances to Step S43.

Step S40

If the user does not select "replace the current printer driver to install a new printer driver" by the operation on the input apparatus 507 in accordance with the installation sequence of the installer 12a, the client 10 executes an installation operation in accordance with an installation sequence of a normal new driver. The installation operation then ends.

Step S41

The GUI display controller 110 causes the display unit 15 to display the inability of replacement of the existing printer driver associated with the printer icon selected by the user, and the installation operation ends without any new printer driver installed in the client 10.

Step S42

If it is determined that "corresponding device name" of the driver information and "device name" of the connection destination information acquired by the information acquiring unit 102 are the same by the determining unit 103, the GUI display controller 110 causes the display unit 15 to display the unnecessity of replacement of the existing printer driver, and the installation operation ends without any new printer driver installed in the client 10.

Steps S43 to S50

Operations at Steps S43 to S50 are similar to the operations at Steps S17 to S24, respectively, illustrated in FIG. 11.

As described above, the installer 12a is started up with timing of the operation by the user without being functioned as a resident application. With this operation, the new printer driver can be installed with the print settings of the existing printer driver appropriately transferred with timing desired by the user.

Second Embodiment

The following describes an installation system according to a second embodiment mainly on points different from the installation system 1 according to the first embodiment. The first embodiment describes the operation in which the installer 12a is started up as the resident application, and the change detector 101 always detects whether the printer has been changed. The present embodiment describes an operation in which a change detector 111 (described below) corresponding to the change detector 101 is included in the printer driver 11a, and when the client 10 uses a printer, that is, when the printer driver 11a is started up, the change detector 111 detects whether the printer has been changed, and if it is detected that the printer has been changed, requests the installer 12a to install a new printer driver. A configuration of the installation system according to the present embodiment is similar to the configuration of the installation system 1 illustrated in FIG. 1, and a hardware configuration of a client and a server included in the installation system is similar to the hardware configuration illustrated in FIG. 2. A functional block configuration of the server is similar to the functional block configuration illustrated in FIG. 9.

Functional Block Configuration of Client

Figure 13:
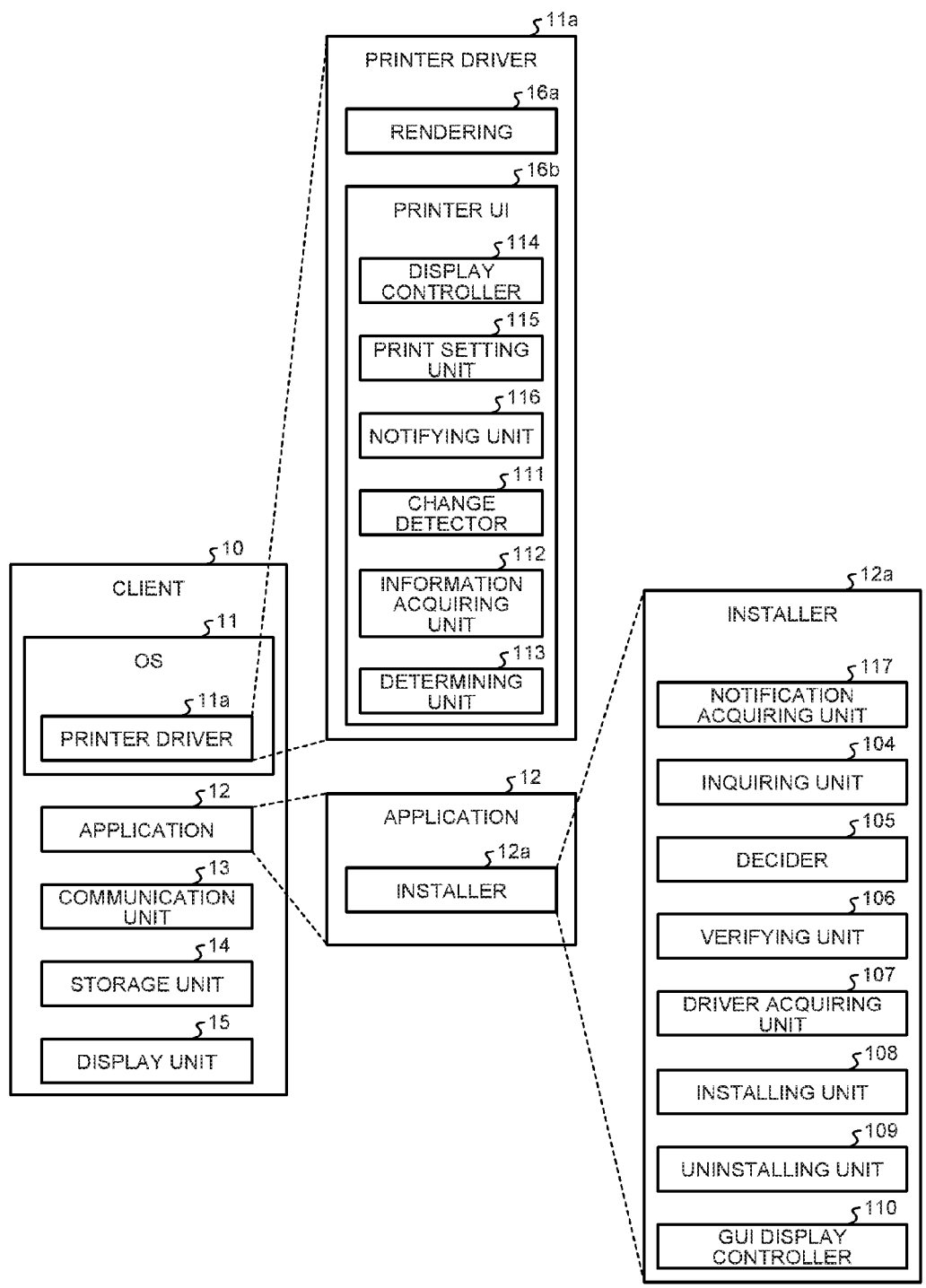
FIG. 13 is a diagram of an example of a functional block configuration of a client according to a second embodiment.

FIG. 13 is a diagram of an example of a functional block configuration of a client according to a second embodiment. The following describes the operation and functional block configuration of the client 10 of the installation system according to the present embodiment with reference to FIG. 13.

As illustrated in FIG. 13, the client 10 includes the OS 11 and the application 12 that are installed and further includes the communication unit 13, the storage unit 14, and the display unit 15.

The OS 11 is basic software such as Windows and controls the operation of a computer program such as the application 12. The OS 11 includes the printer driver 11a.

The printer driver 11a is software that controls the operation of the printer 20 connected to the client 10. The printer driver 11a includes a rendering 16a and a printer UI 16b.

The rendering 16a converts print data delivered from an application (not limited to the application 12) of the client 10 into a specific PDL. The printer UI 16b is executed by the CPU 501 illustrated in FIG. 2, thereby implementing the change detector 111, the information acquiring unit 112, the determining unit 113, a display controller 114, a print setting unit 115, and a notifying unit 116.

The application 12 is a computer program that generates print data and instructs the printer 20 to execute printing out. The application 12 includes the installer 12a.

The installer 12a is the computer program that installs the printer driver for controlling the operation of the printer 20 in the client 10 in order to cause the printer 20 to perform printing out by the application 12. The installer 12a is executed by the CPU 501 illustrated in FIG. 2, thereby implementing a notification acquiring unit 117, the inquiring unit 104, the decider 105, the verifying unit 106, the driver acquiring unit 107, the installing unit 108, the uninstalling unit 109, and the GUI display controller 110.

Operations of the communication unit 13, the storage unit 14, and the display unit 15 are similar to the respective operations described in the first embodiment.

The change detector 111 is a functional unit that detects that a printer as a connection destination of an existing printer driver (a printer controlled by the printer driver) has been changed. The change detector 111 detects whether the printer has been changed when the printer driver 11a is started up as described above.

The information acquiring unit 112 is a functional unit that, if a change of the printer as the connection destination of the existing printer driver is detected by the change detector 111, acquires from the existing printer driver information as information on the printer driver and acquires from a newly replaced printer connection destination information as information on the printer.

The determining unit 113 is a functional unit that determines whether "corresponding device name" of the driver information and "device name" of the connection destination information acquired by the information acquiring unit 112 are different from each other, and if they are different from each other, determines the existing printer driver for which the driver information has been acquired to be an object to be replaced.

The display controller 114 is a functional unit that causes the display unit 15 to display information necessary for the operation of the printer driver 11a, a screen for print settings, or the like.

The print setting unit 115 is a functional unit that performs new settings, changes, or the like of print settings via the screen for print settings displayed on the display unit 15 by the display controller 114.

The notifying unit 116 is a functional unit that, if it is determined that the existing printer driver is the object to be replaced by the determining unit 113, notifies the installer 12a of a replacement request that requests replacement with the new printer driver together with the driver information and the connection destination information acquired by the information acquiring unit 112.

The notification acquiring unit 117 is a functional unit that acquires the notification of the replacement request, the driver information, and the connection destination information from the notifying unit 116 of the printer driver 11a.

The inquiring unit 104 is a functional unit that, when the notification of the replacement request is acquired by the notification acquiring unit 117, transmits an inquiry request that requests information on a printer driver corresponding to the changed printer together with the driver information and the connection destination information to the server 30 via the communication unit 13. The inquiring unit 104 receives inquiry result information as a response to the inquiry request from the server 30 via the communication unit 13.

Operations of the decider 105, the verifying unit 106, the driver acquiring unit 107, the installing unit 108, the uninstalling unit 109, and the GUI display controller 110 are similar to the respective operations described in the first embodiment.

Concerning the change detector 111, the information acquiring unit 112, the determining unit 113, the display controller 114, the print setting unit 115, and the notifying unit 116 of the printer driver 11a and the notification acquiring unit 117, the inquiring unit 104, the decider 105, the verifying unit 106, the driver acquiring unit 107, the installing unit 108, the uninstalling unit 109, and the GUI display controller 110 of the installer 12a, their functions are conceptually illustrated, and such configurations are not limiting. A plurality of functional units illustrated as independent functional units in FIG. 13 may be configured as one functional unit, for example. On the contrary, a function possessed by one functional unit in FIG. 13 may be divided into a plurality of ones to be configured as a plurality of functional units.

Printer Driver Installation Operation in Installation System

Figure 14:
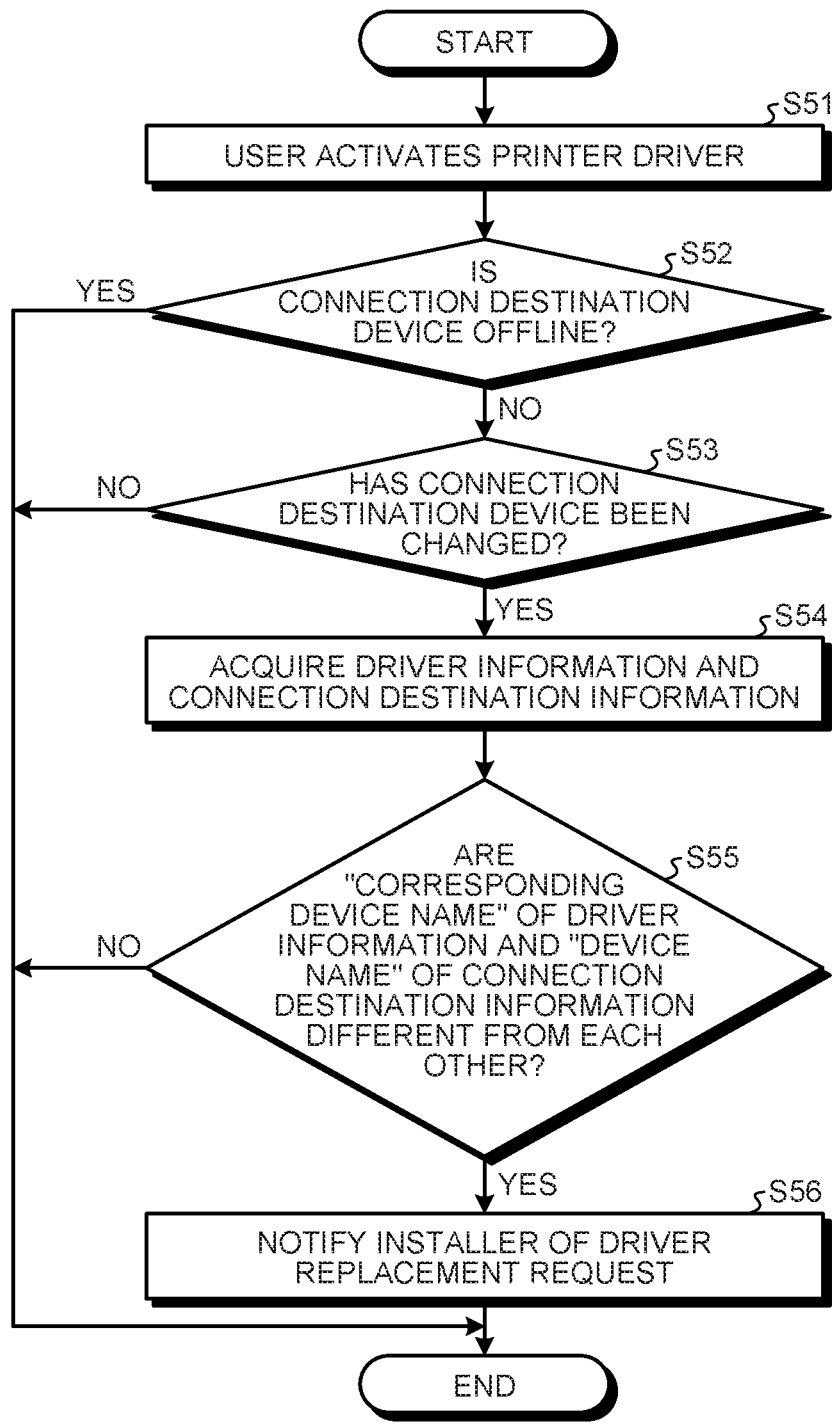
FIG. 14 is a flowchart of an example of an operation performed by a printer driver in a printer driver installation operation in an installation system according to a modification of the second embodiment.
Figure 15:
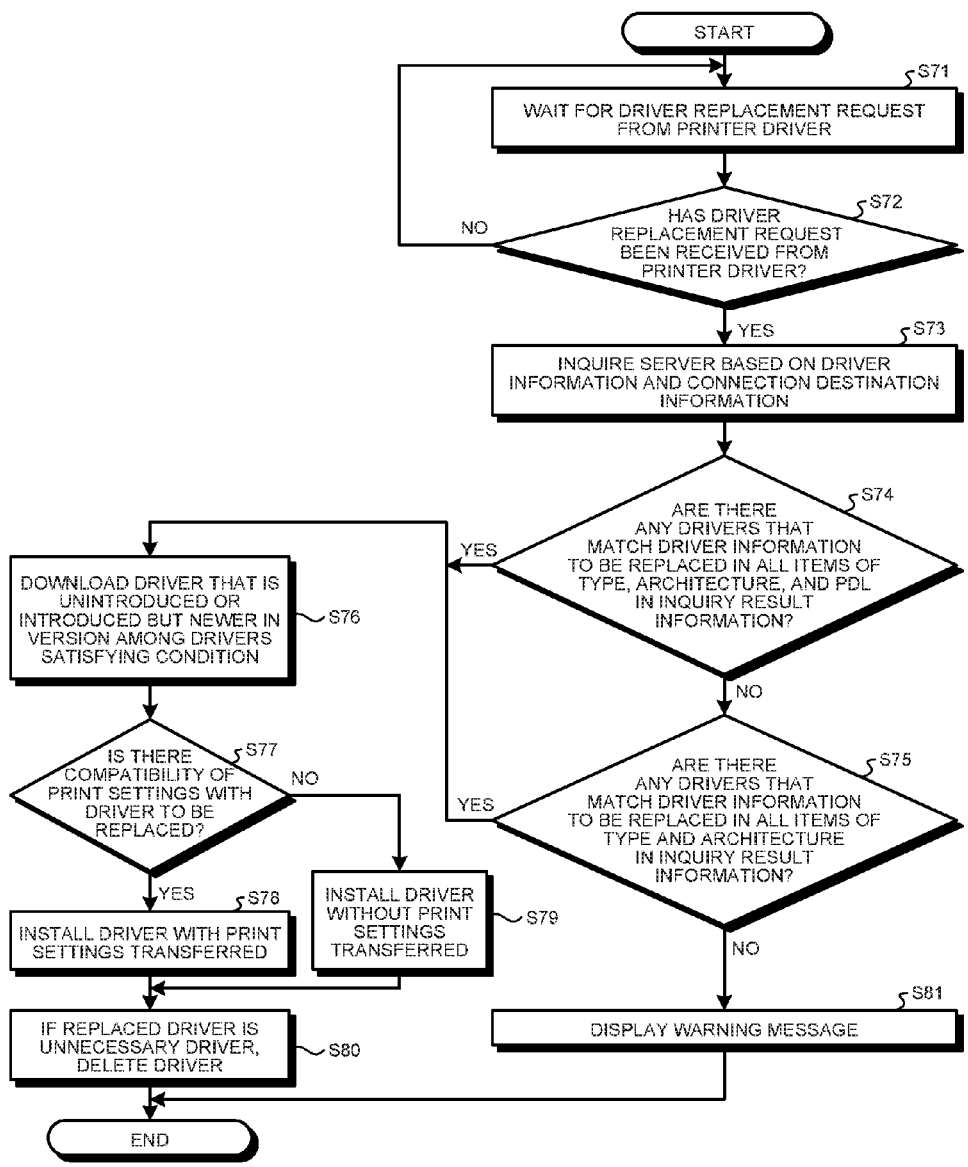
FIG. 15 is a flowchart of an example of an operation performed by an installer in the printer driver installation operation in the installation system according to the modification of the second embodiment.

FIG. 14 is a flowchart of an example of an operation performed by a printer driver in a printer driver installation operation in an installation system according to a modification of the second embodiment. FIG. 15 is a flowchart of an example of an operation performed by an installer in the printer driver installation operation in the installation system according to the modification of the second embodiment. The following describes a procedure of a printer driver installation operation in the installation system according to the present embodiment with reference to FIGS. 14 and 15. First, the following describes an operation of the printer driver 11a with reference to FIG. 14.

Step S51

The user starts up (activates) the printer driver 11a by a startup operation of a print setting screen, an execution operation of a printing operation, or the like of the printer by an operation on the input apparatus 507. The process then advances to Step S52.

Step S52

The change detector 111 determines whether the printer as the connection destination of the existing printer driver is offline. If the printer is not offline (No at Step S52), the process advances to Step S53; if the printer is offline (Yes at Step S52), the installation operation ends without any new printer driver installed in the client 10.

Step S53

The change detector 111 detects whether the printer as the connection destination of the existing printer driver has been changed. If it is detected that the printer has been changed (Yes at Step S53), the process advances to Step S54; if the printer has not been changed (No at Step S53), the installation operation ends without any new printer driver installed in the client 10.

Step S54

If it is detected that the printer as the connection destination of the existing printer driver has been changed by the change detector 111, the information acquiring unit 112 acquires from the existing printer driver the driver information as information on the printer driver and acquires from the newly replaced new printer the connection destination information as information on the printer. The process then advances to Step S55.

Step S55

The determining unit 113 determines whether "corresponding device name" of the driver information and the "device name" of the connection destination information acquired by the information acquiring unit 112 are different from each other. If they are different from each other (Yes at Step S55), the determining unit 103 determines the existing printer driver for which the driver information has been acquired to be the object to be replaced, and the process advances to Step S56. In contrast, if they are the same (No at Step S55), the installation operation ends without any new printer driver installed in the client 10.

Step S56

If it is determined that the existing printer driver is the object to be replaced by the determining unit 113, the notifying unit 116 notifies the installer 12a of the replacement request that requests replacement with the new printer driver together with the driver information and the connection destination information acquired by the information acquiring unit 112.

The foregoing operations at Steps S51 to S56 execute the operation of the printer driver 11a in the installation operation in the installation system according to the present embodiment. Next, the following describes an operation of the installer 12a with reference to FIG. 15.

Step S71

The notification acquiring unit 117 of the installer 12a waits until the acquisition of the notification of the replacement request, the driver information, and the connection destination information from the notifying unit 116 of the printer driver 11a. The process then advances to Step S72.

Step S72

If the notification of the replacement request is acquired from the notifying unit 116 (Yes at Step S72), the notification acquiring unit 117 advances the process to Step S73; if the notification of the replacement request is not acquired (No at Step S72), the notification acquiring unit 117 returns the process to Step S71 to wait until the acquisition of the replacement request.

Step S73

If the notification of the replacement request is acquired by the notification acquiring unit 117, the inquiring unit 104 transmits the inquiry request that requests the information on the printer driver corresponding to the changed printer together with the driver information and the connection destination information to the server 30 via the communication unit 13. The inquiring unit 104 receives the inquiry result information as a response to the inquiry request from the server 30 via the communication unit 13. The process then advances to Step S74.

Steps S74 to S81

Operations at Steps S74 to S81 are the same as the operations at Steps S17 to S24, respectively, illustrated in FIG. 11.

As described above, in the present embodiment, unlike the first embodiment in which the installer 12a is started up as the resident application, and the change detector 101 always detects whether the printer has been changed, when the client 10 uses a printer, that is, when the printer driver 11a is started up, the change detector 111 detects whether the printer has been changed, and if it is detected that the printer has been changed, requests the installer 12a to install the new printer driver. With this operation, in addition to having the effect of the first embodiment, there is no need to keep the installer 12a started up as a resident application, and when the printer driver 11a is started up, the installation operation of the printer driver is executed, whereby a processing load of the client 10 can be reduced.

When at least one of the change detector 101, the information acquiring unit 102, the determining unit 103, the inquiring unit 104, the decider 105, the verifying unit 106, the driver acquiring unit 107, the installing unit 108, the uninstalling unit 109, and the GUI display controller 110 of the installer 12a of the client 10 in the first embodiment is implemented by the execution of a computer program, the computer program may be embedded and provided in the ROM 502 illustrated in FIG. 2 or the like. When at least one of the change detector 111, the information acquiring unit 112, the determining unit 113, the display controller 114, the print setting unit 115, and the notifying unit 116 of the printer driver 11a of the client 10 and the notification acquiring unit 117, the inquiring unit 104, the decider 105, the verifying unit 106, the driver acquiring unit 107, the installing unit 108, the uninstalling unit 109, and the GUI display controller 110 of the installer 12a in the second embodiment is implemented by the execution of a computer program, the computer program may be embedded and provided in the ROM 502 illustrated in FIG. 2 or the like. When at least one of the inquiry processing unit 302 and the driver acquiring unit 303 of the server 30 in the embodiments is implemented by the execution of a computer program, the computer program may be embedded and provided in the ROM 502 illustrated in FIG. 2 or the like.

The computer programs executed in the installation systems of the embodiments may be recorded and provided in a computer-readable recording medium such as a CD-ROM, a flexible disk (FD), a compact disc recordable (CD-R), and a digital versatile disc (DVD), as an installable or executable file. The computer programs executed in the installation systems of the embodiments may be stored in a computer connected to a network such as the Internet and provided by being downloaded via the network. The computer programs executed in the installation systems of the embodiments may be provided or distributed via a network such as the Internet. The computer programs executed in the installation systems of the embodiments have a module structure including at least one of the functional units. As actual hardware, the CPU 501 reads the computer programs from the ROM 502 and executes them, whereby the units are loaded onto a main memory and are generated.

The present invention can install a new printer driver with print settings of an existing printer driver appropriately transferred when a new printer is introduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
    a processor and a memory, the memory containing instructions that, when executed by the processor, configure the processor to:
        communicate with a server via a network interface;
        detect whether a first printer serving as a connection destination of an installed first driver has been changed to a second printer;
        when the processor detects that the first printer has been changed, acquire from the first driver first information that is information on the first driver and acquire from the second printer second information that is information on the second printer;
        transmit an inquiry request to request information on a driver for the second printer together with the first information and the second information to the server via the network interface, and receive inquiry result information that is a response to the inquiry request and that includes the information on the driver for the second printer, the inquiry result information being determined from the first information and the second information;
        determine a second driver to be installed from drivers indicated by the inquiry result information;
        acquire the second driver from the server via the network interface; and
        transfer print settings of the first driver to print settings of the second driver, acquired by the processor, during installation of the second driver.

2. The information processing apparatus according to claim 1, wherein
    the first information includes information on a page description language to be converted by the first driver,
    the inquiry result information includes information on a page description language to be converted by the driver for the second printer,
    when the inquiry result information includes a driver in which a page description language of the driver for the second printer and a page description language of the first information match, the processor is further configured to determine the driver to be the second driver.

3. The information processing apparatus according to claim 1, wherein the processor is further configured to receive the inquiry result information including information on a driver for which presence or absence of compatibility with the print settings of the first driver has been determined by the server.

4. The information processing apparatus according to claim 3, wherein, when the compatibility with the print settings of the first driver is present, the processor is further configured to transfer the print settings during installation of the second driver.

5. The information processing apparatus according to claim 1, wherein the processor is further configured to determine presence or absence of compatibility with the print settings of the first driver for drivers in the inquiry result information.

6. The information processing apparatus according to claim 5, wherein, when the compatibility with the print settings of the first driver is present, the processor is further configured to transfer the print settings during installation of the second driver.

7. The information processing apparatus according to claim 1, wherein, when the first printer is changed, the processor is further configured to detect that the first printer has been changed.

8. The information processing apparatus according to claim 1, wherein
    when a function of the first driver is operated,
        the processor is further configured to detect whether the first printer has been changed, and
        acquire the first information and the second information.

9. The information processing apparatus according to claim 1, wherein
    the first information includes information on a name of a device to which the first driver is applied,
    the second information includes information on a name of the second printer,
    the processor is further configured to determine whether the name of the device indicated by the first information and the name of the second printer indicated by the second information match, and
    transmit the inquiry request when the processor determines that the name of the device indicated by the first information and the name of the second printer indicated by the second information match.

10. An installation system comprising:
    a processor and a memory, the memory containing instructions that, when executed by the processor, configure the processor to:
        communicate with a server via a network interface;
        detect whether a first printer serving as a connection destination of an installed first driver has been changed to a second printer;
        when the processor detects that the first printer has been changed, acquire from the first driver first information that is information on the first driver and acquire from the second printer second information that is information on the second printer;

transmit an inquiry request to request information on a driver for the second printer together with the first information and the second information to the server via the network interface, and receive inquiry result information that is a response to the inquiry request and that includes the information on the driver for the second printer, the inquiry result information being determined from the first information and the second information;

determine presence or absence of compatibility with print settings of the first driver for drivers in the inquiry result information and determine a second driver to be installed from drivers indicated by the inquiry result information;

acquire the second driver from the server via the network interface; and transfer the print settings of the first driver to print settings of the second driver based on a determination result by the processor to install the second driver acquired by the processor.

11. An installation method comprising:

detecting whether a first printer serving as a connection destination of an installed first driver has been changed to a second printer;

when it is detected that the first printer has been changed, acquiring from the first driver first information that is information on the first driver and acquiring from the second printer second information that is information on the second printer;

transmitting an inquiry request to request information on a driver for the second printer together with the first information and the second information to a server via a network interface;

receiving inquiry result information that is a response to the inquiry request and that includes the information on the driver for the second printer, the inquiry result information being determined from the first information and the second information;

determining a second driver to be installed from drivers indicated by the inquiry result information;

acquiring the second driver from the server via the network interface; and transferring print settings of the first driver to print settings of the second driver during installation of the acquired second driver.

12. The installation method according to claim 11, wherein the first information includes information on a page description language to be converted by the first driver, the inquiry result information includes information on a page description language to be converted by the driver for the second printer, when the inquiry result information includes a driver in which a page description language of the driver for the second printer and a page description language of the first information match, the method further comprises determining the driver to be the second driver.

13. The installation method according to claim 11, wherein the method further comprises receiving the inquiry result information including information on a driver for which presence or absence of compatibility with the print settings of the first driver has been determined by the server.

14. The installation method according to claim 13, wherein, when the compatibility with the print settings of the first driver is present, the method further comprises transferring the print settings during installation of the second driver.

15. The installation method according to claim 11, wherein the method further comprises determining presence or absence of compatibility with the print settings of the first driver for drivers in the inquiry result information.

16. The installation method according to claim 15, wherein, when the compatibility with the print settings of the first driver is present, the method further comprises transferring the print settings during installation of the second driver.

17. The installation method according to claim 11, wherein, when the first printer is changed, the method further comprises detecting that the first printer has been changed.

18. The installation method according to claim 11, wherein when a function of the first driver is operated,
the method further comprises detecting whether the first printer has been changed, and
acquiring the first information and the second information.

19. The installation method according to claim 11, wherein the first information includes information on a name of a device to which the first driver is applied, the second information includes information on a name of the second printer, the method further comprises determining whether the name of the device indicated by the first information and the name of the second printer indicated by the second information match, and transmitting the inquiry request when it is determined that the name of the device indicated by the first information and the name of the second printer indicated by the second information match.

20. The installation system according to claim 10, wherein, when the compatibility with the print settings of the first driver is present, the processor is further configured to transfer the print settings during installation of the second driver.

* * * * *